UNITED STATES PATENT OFFICE.

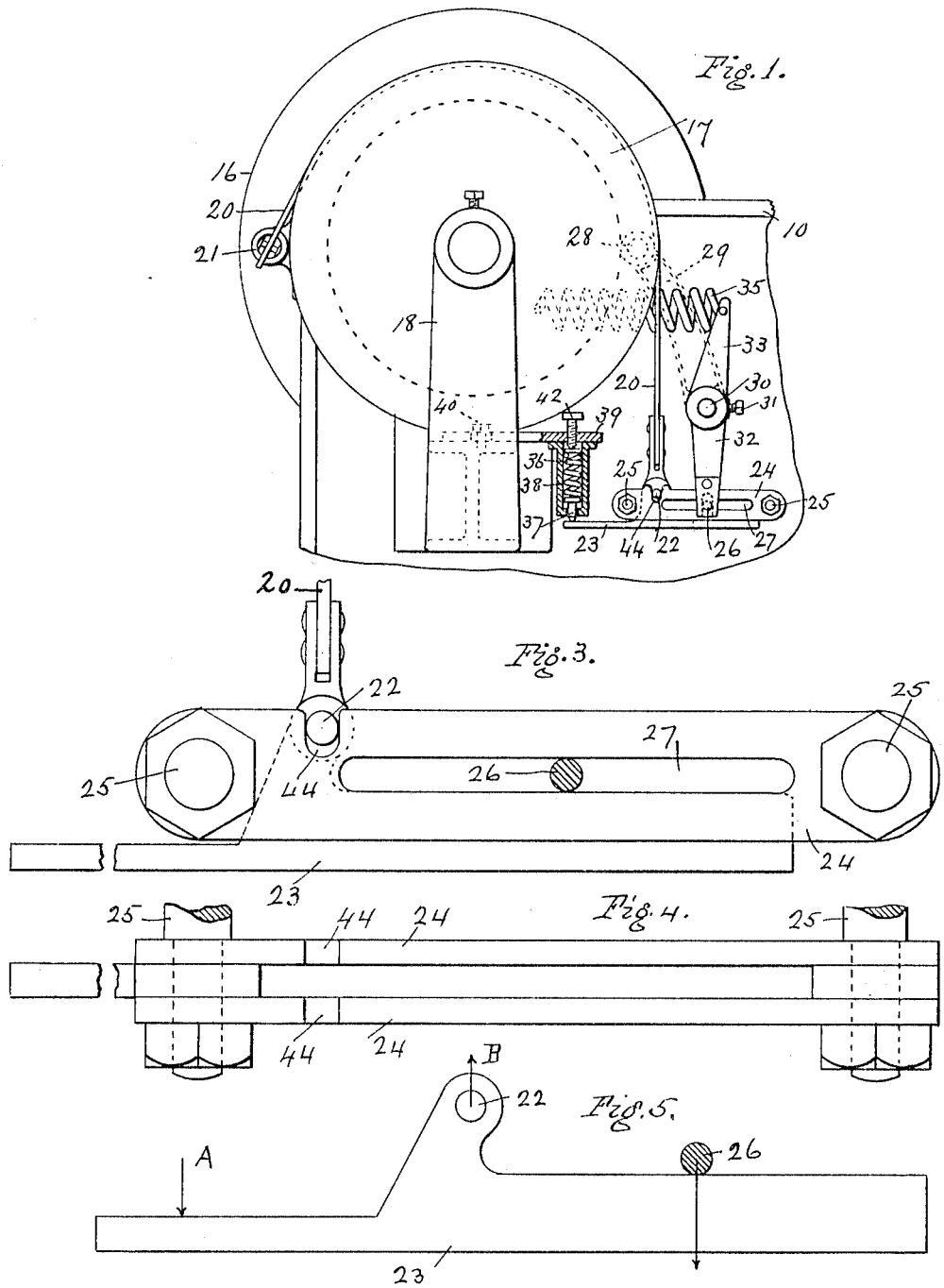

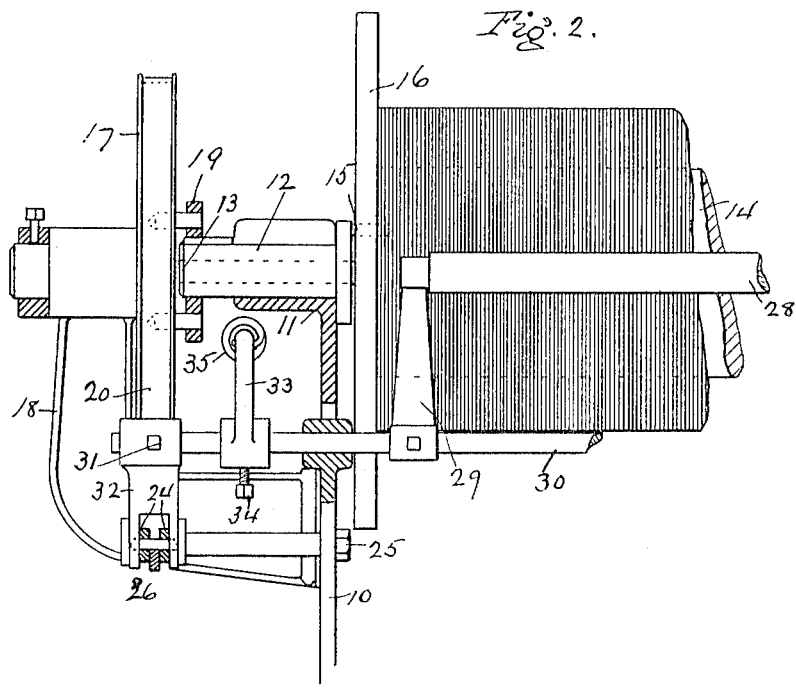
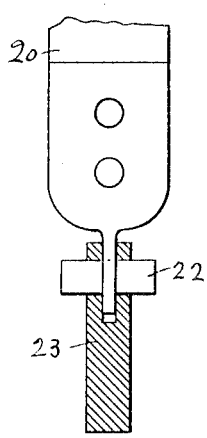

ABEL E. CHERNACK, OF PROVIDENCE, RHODE ISLAND.

LET-OFF FOR LOOMS.

1,105,587.  Specification of Letters Patent.  Patented July 28, 1914.

Application filed November 14, 1912. Serial No. 731,330.

*To all whom it may concern:*

Be it known that I, ABEL E. CHERNACK, a subject of the Czar of Russia, residing in the city of Providence, in the county of Providence, State of Rhode Island, have invented a certain new and Improved Let-Off for Looms, of which the following is a specification.

My invention relates to the construction of frictional let-offs for the warp beams of looms, and the main object of my invention is to construct a simple and efficient let-off which will provide automatically a substantially uniform frictional effect upon the warps, as they are let off.

In the accompanying drawings, Figure 1 is a side elevation with a detail in section, of sufficient of the warp beam end of a loom to illustrate my invention; Fig. 2 is a sectional view at right angles to Fig. 1; Fig. 3 is a side view, drawn to a larger scale, of the brake lever and its guide bars; Fig. 4 is a corresponding plan view of the guide bars; Fig. 5 is a detached side view of the brake lever; and Fig. 6 is a view of the end of the friction brake strap.

In Figs. 1 and 2, a portion of the side frame of the loom is indicated at 10 and is provided with a bearing 11, for a sleeve 12, within which is the spindle 13 of the warp beam 14. This sleeve 12 is provided with a pin 15, which when the sleeve is slipped onto spindle 13 before the beam is put into the loom, will enter a suitable hole in the end flange 16 of the warp beam. By this means when the beam and the adjusted sleeves are slipped into the bearings 11 in the opposite side frames, the sleeves and beam will revolve together.

In connection with the beam I provide at one or both ends thereof a friction brake wheel which is so connected to the beam as to revolve therewith either through the interposition of a suitable clutch or gear wheels or other convenient means. In the drawings I have shown a grooved friction brake wheel 17 mounted to turn in bearings in a bracket 18 secured to the frame of the loom, and adapted to be connected to the sleeve 12 through a suitable horizontally sliding clutch 19 (Fig. 2). With this brake wheel is combined a friction device in the form of a strap 20, bearing upon about one-half (the upper half) of this grooved brake wheel, and this strap 20 is secured at one end (Fig. 1) to a fixed projection 21 on the frame, and carries at its other end a cross pin 22 (Fig. 6), by which it is connected to the brake lever 23 at B (Figs. 1, 3 and 5). This brake lever is prevented from longitudinal as well as lateral movement by being guided horizontally and vertically by and between two fixed and spaced bars 24 held to the side of the frame by suitable bolts and nuts 25. Each bar has a horizontal slot 27 (Figs. 1 and 3) for the reception and guidance of a transverse pin 26 against the underside of which bears the right hand end of the brake lever 23. This pin constitutes a horizontally movable pivot for the brake lever 23, being moved horizontally outward as the warp beam diminishes in diameter, by the following or equivalent means: Bearing against the periphery of the warp beam is a wooden or other roller 28 (Figs. 1 and 2) carried by arms 29 on a cross shaft 30 mounted in suitable bearings in the side frames. To the outer end of this shaft is adjustably secured by a set screw 31 an arm 32, whose lower end is forked to embrace the guide bars 24. These forked ends are slotted to receive and carry the pivot pin 26. To the shaft 30 is also adjustably secured by a set screw 34 an arm 33 to the free end of which is connected a spiral pull spring 35 of which the other end is secured to the frame. The action of this spring is to press the roller 28 constantly against the warp roll and correspondingly to move the pivot 26 toward the right hand end of the brake lever 23 as the warp roll diminishes in diameter. Upon the upper side of the opposite end of this brake lever 23 at A bears a power means, preferably in the form of a spring 36 through a pin 37. This spring is contained within a box 38, carried by a horizontal plate 39, which is secured by headed bolts 40 to the upper side of the bracket 18 (Fig. 1). These bolts 40 pass through slots in the plate 39 to permit of an adjustment of the bearing pin 37 to a limited extent in the direction of the length of the lever 23. A set screw 42 is provided to adjust the pressure of the spring 36, according to the pressure required for the frictional braking effect of the strap 20 upon the brake wheel 17. This brake lever is thus of the second order of levers. The cross pin 22 connecting the brake strap to the lever 23 is guided in deep notches 44 in the upper edges of the bars 24, and thus the longitudinal position of the lever 23 is maintained.

The action of the mechanism will be understood from the foregoing description. As the beam decreases in diameter, the movable pivot 26 for the brake lever will be automatically moved along toward the outer end of the lever away from the points of pressure of power A and resistance B, and consequently the pressure of the friction strap will proportionately diminish. By reason of the adjustments provided at the point of pressure of the spring 36 and at the point of securing of the arm 32 to the shaft 30, the pressure of the brake strap can be made to vary exactly in direct proportion to the diameter of the beam. In other words, by these means the relation between the pressure when the beam is full and the pressure when the beam is nearly empty can be established to give uniform drag upon the warps at all times. Then when this regulation has been established, it is easy to provide greater pressure or less pressure throughout, by adjusting the set screw 42 acting on the spring 36.

By reason of the described construction the action of the mechanism is very sensitive and accurate as well as simple and easily adjusted.

I claim as my invention—

1. A let-off motion for warp beams, comprising a friction wheel to rotate with the beam, a friction device therefor, a brake lever acting upon the friction device, a power means to act upon the brake lever, means to prevent longitudinal movement of the lever, and means for automatically varying the pivot point of the lever in proportion as the diameter of the beam diminishes, for the purpose set forth.

2. A let-off motion for warp beams, comprising a friction wheel to rotate with the beam, a friction strap therefor, a brake lever acting upon the friction strap, a spring to act upon the brake lever, means to prevent longitudinal movement of the lever and means for automatically varying the pivot point of the lever as the diameter of the beam diminishes, for the purpose described.

3. A let-off motion for warp beams, comprising a friction wheel to rotate with the beam, a friction strap therefor, a brake lever of the second order acting upon the friction strap, a spring to act upon one end of the lever, a movable pivot for the other end of the lever with a connection to the brake strap between, means to prevent longitudinal movement of the lever, and means for automatically moving the pivot outwardly as the diameter of the beam diminishes.

4. A let-off motion for warp beams, comprising a friction wheel to rotate with the beam, a friction strap therefor, a brake lever acting upon the friction strap, a power means to act upon the brake lever, means to prevent longitudinal movement of the lever, a spring-pressed roller to bear against the warp beam and a movable pivot for the lever, connected with said roller to move such pivot as the diameter of the beam diminishes, for the purpose set forth.

5. A let-off motion for warp beams, comprising a friction wheel to rotate with the beam, a friction strap therefor, a brake lever acting upon the friction strap, a power means to act upon the lever, slotted bars between which the lever is held and guided, means to prevent longitudinal movement of the lever, a pivot pin for said lever in the slots of the bars, and means for automatically moving the pivot in the slotted plates, as the diameter of the beam diminishes.

In testimony whereof I have signed my name to this specification, in the presence of two subscribing witnesses.

ABEL E. CHERNACK.

Witnesses:
ARTHUR T. S. PHETTEPLACE,
CHARLES M. SALISBURY.